Aug. 4, 1959  G. J. HORNER  2,898,147
ROLL UP TRUCK BODY COVER WITH TELESCOPING
GUIDES HAVING ADJUSTABLE MOUNTINGS
Filed Aug. 2, 1956  2 Sheets-Sheet 1
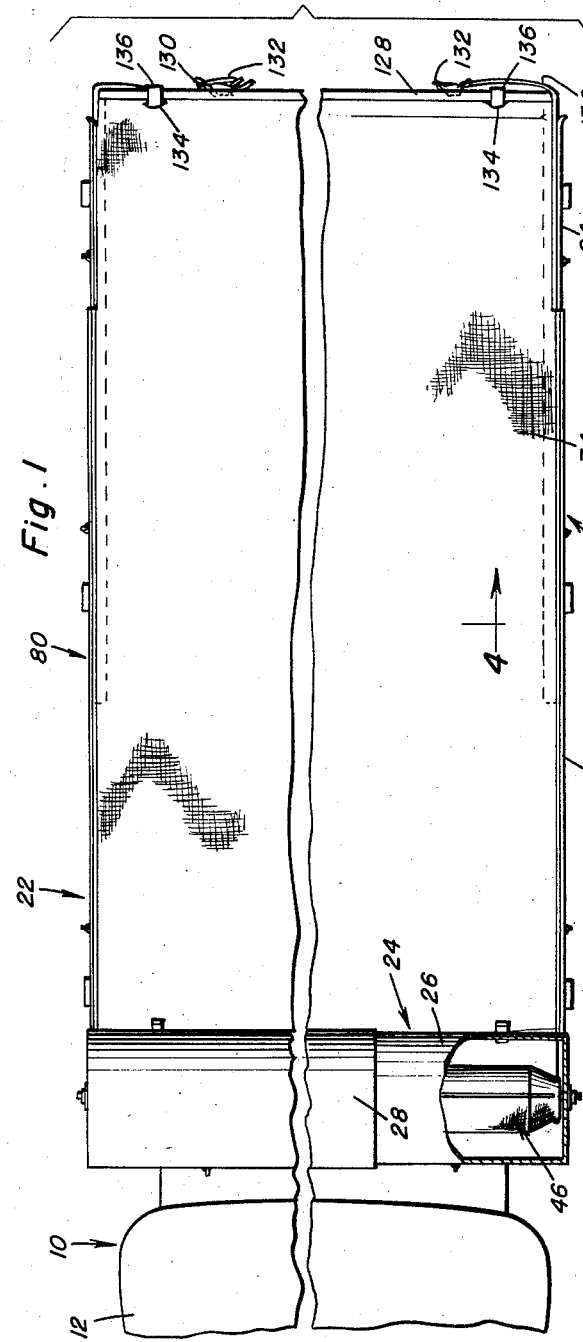
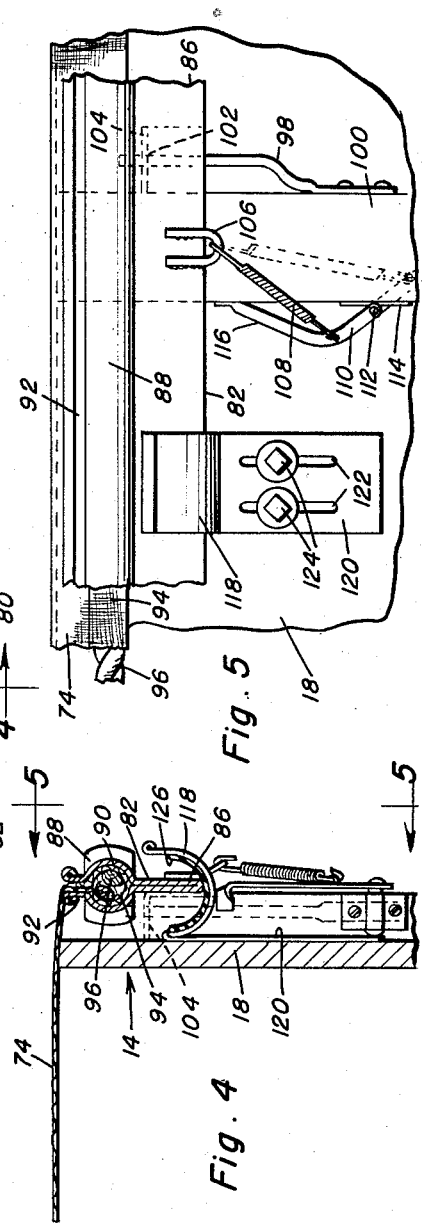
George J. Horner
INVENTOR.
BY *Clarence A. O'Brien*
*and Harvey B. Jackson*
Attorneys

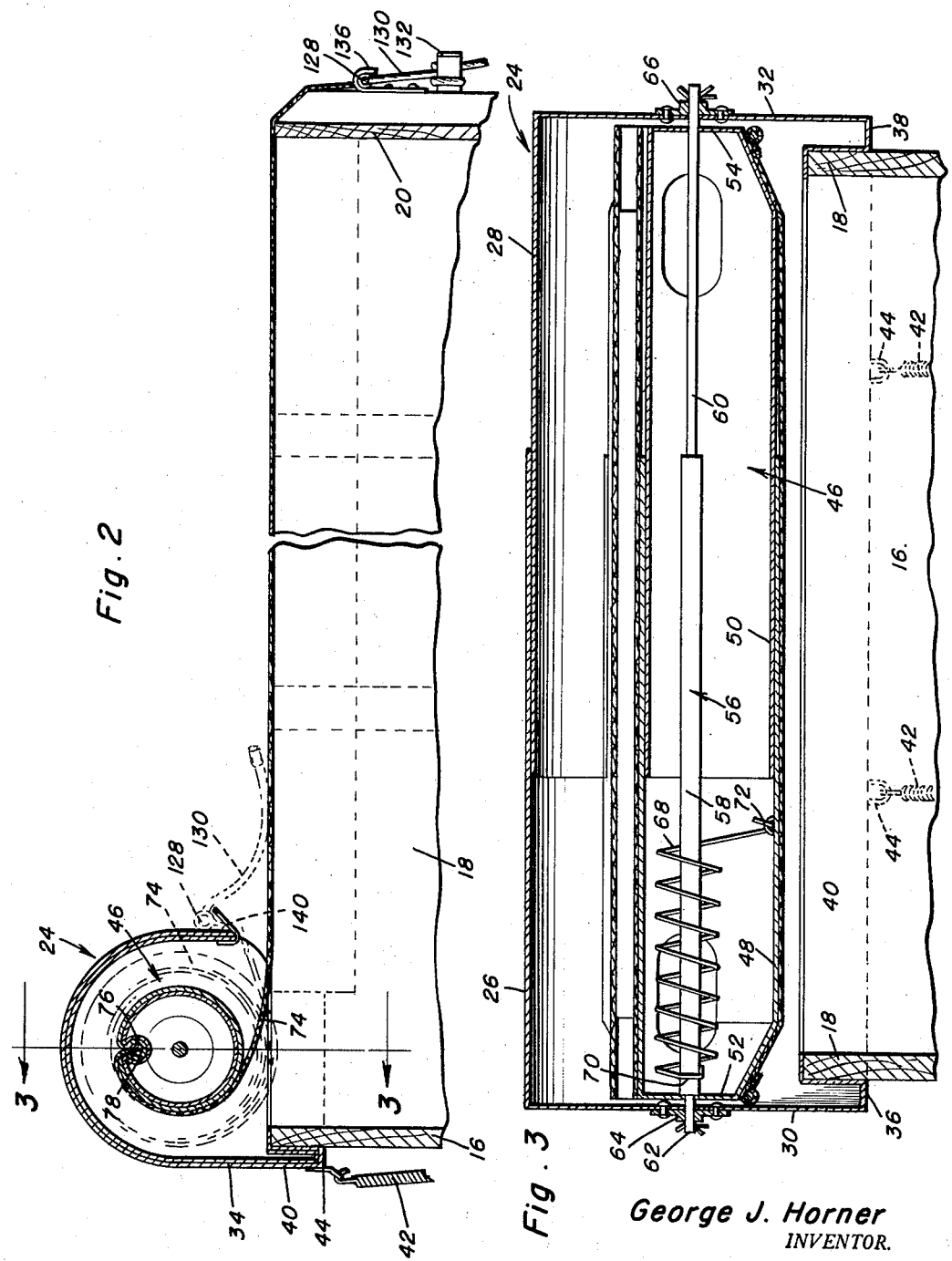

United States Patent Office 2,898,147
Patented Aug. 4, 1959

2,898,147

ROLL UP TRUCK BODY COVER WITH TELESCOPING GUIDES HAVING ADJUSTABLE MOUNTINGS

George J. Horner, Linton, N. Dak.

Application August 2, 1956, Serial No. 601,800

6 Claims. (Cl. 296—98)

In order that farm products, such as grain, corn, ensilage and the like may be readily loaded into trucks and unloaded therefrom, the average farm truck is of the open box type. While such a type of body is highly desirable because of the convenience in loading and unloading, it is necessary that the contents of the truck be protected against the elements from time to time. Accordingly, each truck must be provided with a suitable cover, normally in the form of a large tarpaulin which must be periodically put in place and removed. Because of the size of the cover this is an awkward and time consuming job.

It is therefore the primary object of this invention to provide a truck bed or body cover which is so constructed whereby it may be conveniently mounted on a truck bed and permanently supported thereon, if desired, with a cover member thereof normally being stored in an out-of-the way position.

Another object of this invention is to provide a truck bed cover which includes a flexible cover member, there being provided suitable supports for releasably securing the cover member in place, and mounted on a reel and having side edges thereof disposed in guides whereby the cover member is retained in a stretched condition.

Another object of this invention is to provide an improved truck bed cover which is so constructed whereby the entire cover including a frame assembly thereof may be readily mounted on and removed from a truck bed as the occasion arises.

Still another object of this invention is to provide an improved truck bed cover which includes a supporting frame and a cover member, the supporting frame being of a telescoping construction whereby it may be readily adapted to truck bodies of various sizes.

A further object of this invention is to provide an improved truck bed cover which includes a supporting frame and a flexible cover member, the supporting frame including guides for the side edges of the cover member, there being provided suitable means for moving the guides away from each other to tension the cover member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary top plan view of a conventional farm truck showing the box body thereof provided with the cover which is the subject of this invention, an intermediate portion of the truck being broken away and a portion of a housing of the cover also being broken away and shown in section for purposes of clarity;

Figure 2 is an enlarged fragmentary longitudinal sectional view taken through the upper part of the truck body and shows the details of mounting of the cover thereon, an intermediate portion of the cover of the truck body being omitted, the cover member of the cover being shown in an inoperative position by dotted lines;

Figure 3 is an enlarged fragmentary transverse sectional view taken substantially upon the plane indicated by the section line 3—3 of Figure 2 and shows the specific details of the reel construction and the relationship of the housing supporting the reel with respect to the truck body;

Figure 4 is an enlarged fragmentary sectional view taken substantially upon the plane indicated by the section line 4—4 of Figure 1 and shows the specific details of one of the guides and the relationship thereof with respect to the flexible cover member and a side of the truck body;

Figure 5 is an enlarged fragmentary elevational view of the side of the truck body taken substantially upon the plane indicated by the section line 5—5 of Figure 4 and shows further the details of the mounting of the guide.

Referring now to the drawings in detail, it will be seen that there is illustrated a portion of the conventional farm truck which is referred to in general by the reference numeral 10. Among other details, the farm truck 10 includes a cab 12 and a body 14. The body 14 is of the box-type and includes a front wall 16, side walls 18 and a rear wall 20. Mounted on the upper edge of the truck body 14 is a cover which is the subject of this invention, the cover being referred to in general by the reference numeral 22. While the cover 22 will be illustrated and described as being mounted directly on the upper edges of the truck body 14, if desired, the truck body 14 may be provided with an extension box on which the cover 22 will be mounted.

The cover 22 includes a forward housing which is referred to in general by the reference numeral 24. The forward housing 24 is formed of a pair of telescoping sections 26 and 28 whereby the housing 24 may be adapted to truck bodies of different widths. The section 26 includes an end wall 30. The opposite end of the section 28 includes an end wall 32. The sections 26 and 28 also include forward walls 34. The end walls 30 and 32 are provided with flange constructions 36 and 38, respectively, which are mounted on the upper edges of the side walls 18. The front wall 34 also includes a flange construction 40 which is mounted on the upper edge of the front wall 16.

The housing 24 is retained in place on the truck body 14 by means of a plurality of fasteners which are in the form of spring members 42. The upper ends of the spring members 42 are hooked with clips 44. The lower ends of the spring members 42 (not shown) are hooked to the front wall 16. If desired, the end walls 30 and 32 may be provided with suitable spring retaining members for further holding down the housing 24.

Mounted within the housing 24 is an elongated reel which is referred to in general by the reference numeral 46. The reel 46 includes a pair of telescoped sections 48 and 50. The section 48 is provided with an end wall 52. The section 50 is provided with an end wall 54. Disposed within the reel 46 is a shaft assembly which is referred to in general by the reference numeral 56. The shaft assembly 56 includes a shaft section 58 and a shaft section 60, the shaft sections 58 and 60 being disposed in telescoped relation. The shaft section 58 includes a reduced end portion 62 which extends through the end wall 52 of the reel section 48 and through the end wall 30 of the housing section 26. The end wall 30 is provided with a suitable bearing 64 in which the shaft extension 62 is rotatably journalled.

The opposite end of the shaft section 60 passes through the end wall 54 of the reel section 50 and the end wall 32 of the housing section 28. The end wall 32 is provided with a suitable bearing 66 in which the shaft section 60 is rotatably journaled to support the reel 46.

At this time it is pointed out that in some instances the shaft 56 will be rotatably journalled in the bearings 64 and 66 to rotate with the reel 46. In other instances, such as that illustrated in Figure 3, a shaft 56 will be fixed against rotation and the reel 46 will rotate thereon. Entrained about the shaft section 58 is a coil spring 68 which has one end anchored to the shaft 58 as at 70. The opposite end of the spring 68 is anchored relative to the reel section 48 as at 72. The spring 68 is so mounted whereby as the flexible cover member, such as the cover member 74, is reeled off of the reel 46, the spring 68 will be wound up. Then when the cover member 74 is released, the reel 46 will be self-winding to return the cover member 74 to its initial position.

As is best illustrated in Figures 2 and 3, the reel 46 is provided with a longitudinal recess 76 in the sections 48 and 50 thereof. Interlocked in the recess 76 is a reinforced end 78 of the cover member 74. Thus the cover member 74 is releasably secured to the reel 46.

In order that the side edges of the cover member 74 may be held in place with respect to the truck body 14, there is provided a pair of guides 80. The guides 80 extend the length of the sides 18 of the truck body 14 and may have their forward ends secured to their respective sections of the housing 24. The guides 80 are formed in telescoped sections and include forward sections 82 and rear sections 84. By making the sections 82 and 84 in telescoped relation, it will be seen that the cover 22 may be adjusted to fit truck bodies of various lengths.

Referring to Figures 4 and 5 in particular, it will be seen that the guide section 82, which is typical of the sections of the guides 80, is disposed exteriorly of the truck body 14 and is in the form of a single sheet of metal bent to include a vertical portion 86 which is doubled upon itself. A portion of the guide section 82 is generally circular in outline as at 88 to form a recess 90. The extreme upper end of the guide 82 is in the form of a pair of spaced flanges 92.

Disposed within the circular portion 90 of the guide 82 is a side edge of the cover member 74. The side edge is referred to by the reference numeral 94 and is reinforced by a cord 96 which extends therethrough, the side edge 94 being in the form of a sleeve or loop.

The guide section 82 is restrained against longitudinal shifting by a plurality of longitudinally spaced brackets 98. Each bracket 98 is secured to an upright 100 of the truck body 14 received in an opening 102 of the flange 104 secured to the vertical portion 82.

In order that the cover member 74 may be tensioned, there is secured to the guide section 82 a fitting 106 in which there is hooked an upper end of a spring connector 108. The lower end of the spring connector 108 is connected to a lever 110 which is pivotally mounted as at 112 to a bracket 114 carried by the upright. The lever 110 also includes a handle portion 116 to move it to a spring connected tensioning position.

In order that the guide 80 may be supported when the cover member 74 is reeled upon the reel 46, there is secured to the exterior surfaces of the side walls 18 a plurality of U-shaped suports 118. Each U-shaped support 118 includes a vertical mounting flange 120 which is adjustably secured to its respective side wall 18 by means of a plurality of fasteners 124 disposed in vertical slots 122 in the flanges 120. It is to be noted that the U-shaped support 118 is provided with a suitable lining 126 to prevent the rattling of the guides 80 therein. It is to be understood that the cover member 74 will be of such a width so that the guides 80 normally do not seat in the U-shaped supports 118 when the cover member 74 is positioned therein.

The rear end of the cover member 74 is in the form of a rolled reinforced edge 128. The edge 128 has connected thereto suitable pull ropes 130 to facilitate both the pulling of the cover member 74 from a retracted position and a tying down of the rear edge 128 through the use of suitable cleats 132 mounted on the rear wall 20. The cover member 74 is also provided with suitable openings 134 immediately adjacent the rear edge 128, the openings 134 receiving fixed hooks 136 carried by the rear wall 20.

In the event it is desired to move the cover member 74 from a retracted position to an extended position without the necessity of one climbing onto the truck body 14, this can be accomplished by having the pull ropes 130 in the form of extensions of the reinforcing ropes 96, the reinforcing ropes 96 extending down through the guides 80 at all times and being of such a length whereby they will always extend down through the back ends of the guide 80 for conveniently gripping.

Referring now to Figure 2 in particular, it will be seen that when the flexible cover member 74 is wound upon the reel 46, the reinforced rear edge 128 is retained in a fixed position relative to the housing 24 by means of hooks 140 which are received in the openings 134.

From the foregoing description of the cover, it will be readily apparent that there has been devised a suitable cover which may be mounted on box-type truck bodies or other similar types of truck bodies in such a manner whereby they may be conveniently moved from an inoperative position to an operative position and which may be conveniently anchored so as to tightly seal the top of the truck body. Also, the cover is of such a nature whereby it may be readily mounted on truck bodies of different sizes with a minimum of effort and is so constructed whereby it may be removed and replaced on the truck body as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A truck bed cover comprising a reel, reel mounting means for detachably mounting said reel on a truck body, a cover member wound on said reel, longitudinal guides including telescoped sections for guide length adjustment so that said guides are adapted to be used on trucks of various length, guide mounting means for mounting said guides on sides of a truck body, said cover member having edges entirely disposed in and held by said guides for retaining said cover member in place, said guide mounting means including adjustable hold-down members so that the guides may be shifted to tension said cover member and adapt it for mounting on trucks of various widths.

2. A truck bed cover comprising a reel, reel mounting means for detachably mounting said reel on a truck body, a cover member wound on said reel, longitudinal guides including telescoped sections for guide length adjustment so that said guides are adapted to be used on trucks of various length, guide mounting means for mounting said guides on sides of a truck body, said cover member having edges entirely disposed in and held by said guides for retaining said cover member in place, said guide mounting means including adjustable hold-down members so that the guides may be shifted to tension said cover member and adapt it for mounting on trucks of various widths, said reel mounting means including a housing, resilient fasteners on said housing for removably securing said housing in place, said housing being generally cylindrical in configuration, a forward flange and a pair of side flanges depending from said housing for engagement with the upper forward wall and the upper forward sides respectively of a truck bed so that said housing may engage the upper forward portion of a truck bed, said resilient fasteners being attached between said forward flange and the forward wall of the truck bed.

3. A truck bed cover comprising a reel, reel mounting means for detachably mounting said reel on a truck body, a cover member wound on said reel, longitudinal guides including telescoped sections for guide length adjustment so that said guides are adapted to be used on trucks of various length, guide mounting means for mounting said guides on sides of a truck body, said cover member having edges entirely disposed in and held by said guides for retaining said cover member in place, said guide mounting means including adjustable hold-down members so that the guides may be shifted to tension said cover member and adapt it for mounting on trucks of various widths, said hold-down members including spring connectors, lever connected to said spring connectors for selectively tensioning the latter.

4. A truck bed cover comprising a reel, reel mounting means for detachably mounting said reel on a truck body, a cover member wound on said reel, longitudinal guides including telescoped sections for guide length adjustment so that said guides are adapted to be used on trucks of various length, guide mounting means for mounting said guides on sides of a truck body, said cover member having edges entirely disposed in and held by said guides for retaining said cover member in place, said guide mounting means including adjustable hold-down members so that the guides may be shifted to tension said cover member and adapt it for mounting on trucks of various widths, said hold-down members including spring connectors, levers connected to said spring connectors for selectively tensioning the latter, adjustable stop members for supporting said guides in inoperative positions.

5. A truck bed cover comprising a reel, reel mounting means for detachably mounting said reel on a truck body, a cover member wound on said reel, longitudinal guides including telescoped sections for guide length adjustment so that said guides are adapted to be used on trucks of various length, guide mounting means for mounting said guides on sides of a truck body, said cover member having edges entirely disposed in and held by said guides for retaining said cover member in place, said guide mounting means including adjustable hold-down members so that the guides may be shifted to tension said cover member and adapt it for mounting on trucks of various widths, said guides being circular in cross-section and having longitudinal slots formed therein, a pair of lips defining channels communicating with said guides, said cover edges being reinforced to form a bead disposed within said guides.

6. A truck bed cover comprising a reel, reel mounting means for detachably mounting said reel on a truck body, a cover member wound on said reel, longitudinal guides including telescoped sections for guide length adjustment so that said guides are adapted to be used on trucks of various length, guide mounting means for mounting said guides on sides of a truck body, said cover member having edges entirely disposed in and held by said guides for retaining said cover member in place, said guide mounting means including adjustable hold-down members so that the guides may be shifted to tension said cover member and adapt it for mounting on trucks of various widths, said reel mounting means including a housing, resilient fasteners on said housing for removably securing said housing in place, said housing being generally cylindrical in configuration, a forward flange and a pair of side flanges depending from said housing for engagement with the upper forward wall and upper forward sides respectively of a truck bed so that said housing may engage the upper forward portion of a truck bed, said resilient fasteners being attached between said forward flange and the forward wall of the truck bed, said hold-down members including spring connectors, levers connected to said spring connectors for selectively tensioning the latter, adjustable stop members for supporting said guides in inoperative positions, said guides being circular in cross-section and having longitudinal slots formed therein, a pair of lips defining channels communicating with said guides, said cover edges being reinforced to form a bead disposed within said guides.

References Cited in the file of this patent

UNITED STATES PATENTS

| | | |
|---|---|---|
| 1,069,219 | Batten | Aug. 5, 1913 |
| 1,656,077 | Schlicher | Jan. 10, 1928 |
| 1,798,736 | Helms | Mar. 31, 1931 |
| 2,230,908 | Reiman | Feb. 4, 1941 |
| 2,510,307 | Daniels | June 6, 1950 |
| 2,562,209 | Peterson | July 31, 1951 |
| 2,591,186 | Neitzke | Apr. 1, 1952 |
| 2,757,042 | Schultz | July 31, 1956 |
| 2,807,499 | Duddleston | Sept. 24, 1957 |

FOREIGN PATENTS

| | | |
|---|---|---|
| 1,066,784 | France | June 9, 1954 |